United States Patent [19]

Claar et al.

[11] Patent Number: 5,004,714
[45] Date of Patent: Apr. 2, 1991

[54] METHOD OF MODIFYING CERAMIC COMPOSITE BODIES BY A POST-TREATMENT PROCESS AND ARTICLES PRODUCED THEREBY

[75] Inventors: Terry D. Claar; William B. Johnson, both of Newark, Del.; Robert A. Rapp, Columbus, Ohio

[73] Assignee: Lanxide Technology Company, LP, Newark, Del.

[21] Appl. No.: 296,966

[22] Filed: Jan. 13, 1989

[51] Int. Cl.$^5$ .............................................. C04B 35/10
[52] U.S. Cl. ..................................... 501/134; 501/96; 501/93; 501/127; 501/128; 75/235; 264/63; 264/60; 423/625; 423/412
[58] Field of Search ................... 420/129, 590; 419/12, 419/14, 27; 75/236; 501/127, 134

[56] References Cited

U.S. PATENT DOCUMENTS

| | | | |
|---|---|---|---|
| 3,758,662 | 9/1973 | Tobin | 264/332 |
| 4,471,059 | 9/1984 | Yoshino et al. | 501/96 |
| 4,595,545 | 6/1986 | Sane | 264/65 |
| 4,605,440 | 8/1986 | Halverson | 75/238 |
| 4,617,053 | 10/1986 | Joó et al. | 419/27 |
| 4,692,418 | 9/1987 | Boecker et al. | 501/90 |
| 4,702,770 | 10/1987 | Pyzik | 75/236 |
| 4,718,941 | 1/1988 | Halverson | 75/236 |
| 4,737,328 | 4/1988 | Morelock | 419/27 |
| 4,777,014 | 10/1988 | Newkirk et al. | 419/12 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 4/1975 | United Kingdom ................. 75/244 |

Primary Examiner—William R. Dixon, Jr.
Assistant Examiner—C. Melissa Bonner
Attorney, Agent, or Firm—Mark G. Mortenson; William E. McShane; Carol A. Lewis

[57] ABSTRACT

The present invention relates to a novel method of manufacturing a composite body, such as a $ZrB_2$—Zr-C—Z composite body, by utilizing a post-treatment technique. Moreover, the invention relates to novel products made according to the process. The novel process modifies at least a portion of a composite body by exposing said body to a source of second metal.

5 Claims, 2 Drawing Sheets

METHOD OF MODIFYING CERAMIC COMPOSITE BODIES BY A POST-TREATMENT PROCESS AND ARTICLES PRODUCED THEREBY

FIELD OF THE INVENTION

This invention relates generally to a novel method of manufacturing a composite body, such as a $ZrB_2$—Zr-C—Zr composite body, including the use of a post-treatment technique, and to novel products made thereby. More particularly, the invention relates to a method of modifying a composite body comprising one or more boron-containing compounds (e.g., a boride or a boride and a carbide) which has been made by the reactive infiltration of a molten parent metal into a bed or mass comprising boron carbide, and optionally one or more inert fillers, to form the body.

BACKGROUND OF THE INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare boride-containing materials.

DISCUSSION OF RELATED PATENT APPLICATIONS

Many of the above-discussed problems associated with the production of boride-containing materials have been addressed in co-pending U.S. patent application Ser. No. 073,533, filed in the names of Danny R. White, Michael K. Aghajanian and T. Dennis Claar, on July 15, 1987, and entitled "Process for Preparing Self-Supporting Bodies and Products Made Thereby".

The following definitions were used in U.S. application Ser. No. '533 and shall apply to the instant application as well.

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of U.S. application Ser. No. '533, self-supporting ceramic bodies are produced by utilizing a parent metal infiltration and reaction process (i.e., reactive infiltration) in the presence of a boron carbide. Particularly, a bed or mass of boron carbide is infiltrated and reacted by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of U.S. application Ser No. '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in U.S. application Ser. No. '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boro compound(s) and parent metal carbide is at least about 50%, and most preferably at least about 90%.

The typical environment or atmosphere which was utilized in U.S. application Ser. No. '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Copending U.S. patent application Ser. No. 137,044 (hereinafter referred to as "application Ser. No. '044"), filed in the names of Terry Dennis Claar, Steven Michael Mason, Kevin Peter Pochopien and Danny Ray White, on Dec, 23, 1987, and entitled "Process for Preparing Self-Supporting Bodies and Products Made Thereby", is a Continuation-in-Part .aApplication of U.S. application Ser. No. '533. U.S. Application Ser. No. '044 discloses that in some cases it may be desirable to add a carbon donor material (i.e., a carbon-containing compound) to the bed or mass of boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

U.S. Application Ser. No. '044 also discloses the use of a graphite mold which contains an appropriate number of through-holes having a particular size, shape and location which function as a venting means to permit the removal of, for example, any gas which may be trapped in the preform or filler material as the parent metal reactive infiltration front infiltrates the preform.

In another related application, specifically, Copending U.S. patent application Ser. No. 137,382 now U.S. Pat. No. 4,822,782 (hereinafter referred to as "U.S. Pat. No. '782"), filed in the names of Terry Dennis Claar and Gerhard Hans Schiroky, on Dec. 23, 1987, and entitled "A Method of Modifying Ceramic Composite Bodies By a Carburization Process and Articles Made Thereby", additional modification techniques are disclosed. Specifically, U.S. Pat. No. '782 discloses that a ceramic composite body made in accordance with the teachings of U.S. Pat. No. '782 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, U.S. Pat. No. '782 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between 5-30 volume percent, such composite body could be modified by a post-carburization treatment to result in from about 0 to about 2 volume percent, typically about ½ to about 2 volume percent, of parent metal remaining in the composite body.

The disclosures of each of the above-discussed Commonly Owned U.S. Applications are herein expressly incorporated by reference.

SUMMARY OF THE INVENTION

The present invention has been developed in view of the foregoing and to overcome the deficiencies of the prior art.

The invention provides a method for modifying the resultant properties of a formed composite body. More particularly, a formed composite body, as discussed later herein, can be modified by contacting the formed body with a second material which contains at least one metal which is reactive with at least one of the residual metal and/or ceramic phases in the formed body (e.g., the second material may be comprised primarily of the reactive metal (e.g., a reactive powdered metal) or only a portion of the second material may comprise a reactive metal (e.g., a compound which contains at least one reactive component)). Thus, the formed body may be contacted with a bed or powdered material containing a second metal. Upon such contact, residual parent metal in the formed composite body and/or at least one of the phases in the formed body, may react with the second metal contained in the second material (i.e., the bed or powdered material) thereby modifying the properties of the composite body. For example, aluminum or silicon metal could function as the second metal and they could be provided in the form of a powder. Such powder, when placed into contact with the formed ceramic composite body in the presence of, for example, an inert atmosphere, would result in a reaction of the second metal with the formed ceramic composite body (e.g., a reaction between the aluminum or silicon metal with at least one of the ceramic phases in the formed body and/or a reaction with residual parent metal in the formed body).

The amount of conversion or reaction could be controlled to any desired extent. For example, the reaction could be confined to a surface area or could extend beyond the surface of a ceramic composite body.

Moreover, the source of second metal may be any source or donor material which provides, under the process temperatures and process conditions, at least some second metal for reaction with at least one component in the formed body.

Each of the treatments discussed above herein typically is effected after a composite body is formed by the process disclosed in the copending Applications discussed above herein.

Stated more specifically, after a composite body is produced according to, for example, U.S. application Ser. No. '533, the composite may, for example, be embedded in a powdered material (e.g., alumina, a mixture of alumina and silicon or a mixture of alumina and silica, etc.). The powder should, preferably, physically contact at least one surface of the formed composite body and both the formed composite body and powdered material are contained in, for example, a graphite or an alumina crucible. The entire assembly is heated in an inert or substantially non-reactive atmosphere (e.g., argon) up to a temperature which permits reaction of the powdered material (i.e., the second metal) and the formed composite body. The reaction can be localized to a surface of the composite body, or may extend into the composite body any predetermined amount.

Such post-treatment techniques are advantageous because a composite body modified by such treatments may be more resistant to oxidation (i.e., at least that portion thereof which has been modified by the aforementioned post-treatment processes may be more resistant to oxidation relative to an untreated portion of the body).

This application refers primarily to $ZrB_2$—$ZrC$—$Zr$ composite bodies, hereinafter sometimes referred to as "ZBC" composite bodies. However, it should be understood that while specific emphasis has been placed upon ZBC composite bodies, similar manufacturing steps are applicable to, for example, titanium and hafnium parent metal composite bodies as well.

DETAILED DESCRIPTION OF THE PREFERRED EMBODIMENTS

Figure 1:
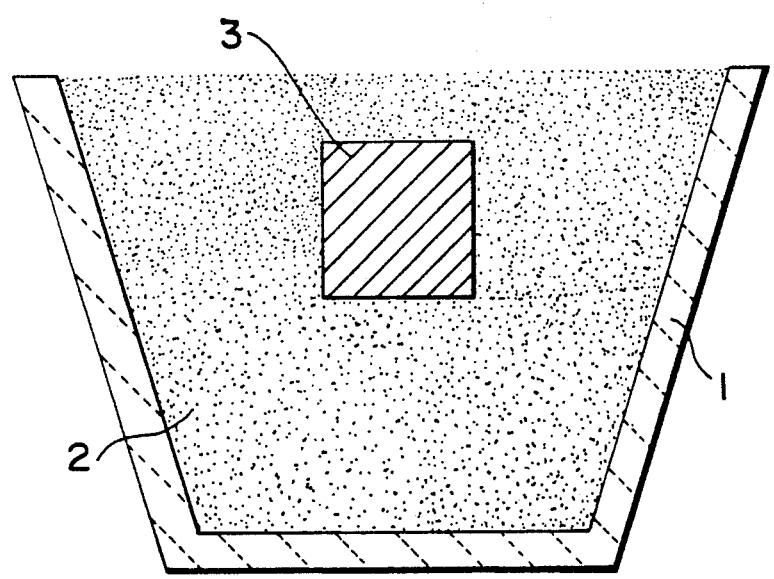
FIG. 1 is a schematic elevational view in cross-section showing a ZBC composite body 3 embedded in a graphitic powder bedding 2 and contained within a refractory vessel 1, to be processed according to the present invention.

The present invention is based on the discovery that the properties of a ceramic composite body, particularly a ceramic composite body which is manufactured by the reactive infiltration of a parent metal of zirconium, hafnium, or titanium into a boron carbide mass, can be modified by a post-manufacturing treatment. Such a post-manufacturing treatment can alter the microstructure, and thus the resultant mechanical properties, of a portion or substantially all of a ZBC composite body.

A ZBC composite body, produced according to any of the patent applications discussed above herein, for example, U.S. application Ser. No. '533, can be modified by exposing the composite to a second material which contains at least one second metal which is reactive with at least one of the residual metal and/or ceramic phases in the formed body. Such reaction, in some circumstances, may be characterized as a diffusion reaction. For example, a reaction could be induced by embedding a ZBC composite body in a graphitic bedding and reacting at least a portion of the graphitic bedding, in some manner, with at least a portion of the formed ZBC body.

In a preferred embodiment, a formed composite body, for example, a ZBC body produced according to U.S. application Ser. No. '533, can undergo a surface modification by contacting the formed body with a material which contains at least one second metal which is reactive with at least one of the residual metal and/or ceramic phase(s) in the formed body. More particularly, the formed body may be at least partially buried in a bed or powdered material containing a second metal. For example, silicon metal could be provided in the form of a powder and the powder may be placed into contact with at least a portion of the formed ceramic composite body in the presence of, for example, an inert atmosphere. When such an arrangement was subjected to an elevated reaction temperature, a reaction between the powdered metal and the formed ceramic composite body occurred. Thus, when a ZBC body was contacted with a silicon bedding in the presence of a substantially inert atmosphere at about 1300° C., surface coatings comprising $ZrSi_2$ and $ZrSiO_4$ will begin to form on the composite body. Not wishing to be bound by any particular theory or explanation, it is believed that the silicon may diffuse into the ZBC body and react with either or both of the ZrC and Zr phases.

Similar to the formation of a siliconized coating, the formed body (e.g., a ZBC body) may also be aluminized by embedding a formed body into a bed comprising $Al_2O_3$, $Al_2O_3$—Si, and/or other Al containing beddings.

Although each of the conversions discussed above may extend beyond the immediate surface area of a ZBC body, it has been discovered that when such a surface coating is formed, the coating made according to the present invention exhibits an improved coherence to the formed body relative to externally applied coatings (e.g., by plasma spraying, CVD, PVD, etc.).

Such post-treatment techniques are advantageous because any portion of a composite body which has been modified by such treatments, will be more resistant to oxidation, relative to a portion which has not been modified by the aforementioned post-treatment processes. Particularly, it has been discovered that a ZBC body which has been siliconized, as discussed above (i.e., wherein at least a portion of the body has been converted to $ZrSiO_4$), has improved oxidation resistance in moist air at high temperatures (e.g., 1100° C.).

It is possible to modify further the ZBC body by including another material with, for example, the silicon or alumina. Specifically, in the case of a silicon bedding, in some situations it may be desirable to include at least some germanium with the silicon bedding. The germanium may modify the converted portion of the ZBC even further, thereby imparting even more desirable properties to the converted region.

Moreover, by controlling the time of exposure of the ZBC composite body to the second material, for example, silicon or aluminum, and/or the temperature at which reaction or modification occurs, the modified zone or layer that is formed on at least the exterior surface of a formed body can be controlled in virtually an unlimited fashion (i.e., composition, morphology and/or thickness can all be controlled in a desirable manner). Thus, the above-discussed post-treatment process can result in a hard, wear-resistant surface surrounding a core of ZBC composite material having a higher metal content and higher fracture toughness.

The following are examples of the present invention. The examples are intended to be illustrative of various aspects of a post-treatment of a composite body, particularly a ZBC composite body. However, these examples should not be construed as limiting the scope of the invention.

EXAMPLE 1

In this example a ZBC body was formed substantially according to the procedures set forth in Example 1 of application Ser. No. '533. The ZBC body was substantially cylindrical having a diameter measuring about 7.8 millimeters and a length of approximately 12.5 millimeters and weighing about 3.7 grams. The ZBC cylinder was embedded (i.e., substantially completely surrounded) in a bedding comprising $ZrSiO_4$ mixed with about 25 weight percent silicon metal. The $ZrSiO_4$ was sold under the trade name of EXCELOPAX and the silicon metal was sold under the trade name of AEE-325. The ZBC body surrounded by the mixture of $ZrSiO_4$ and silicon metal was contained in a high purity $Al_2O_3$ boat.

The alumina boat was placed into an electric resistance heating furnace. The furnace was twice evacuated and backfilled with argon. During the subsequent heating steps, dry argon was passed through the furnace at a rate of about 500 cc/minute. The furnace was brought up to a temperature about 1300° C. at a rate of 200° C. per hour. This temperature was maintained for about six hours. The furnace was allowed to cool to room temperature at a rate of about 200° C. per hour. The alumina boat was removed from the furnace and the ZBC cylinder was inspected. It was discovered that the ZBC cylinder had been modified by this treatment. Specifically, the ZBC cylinder contained a silicon-containing coating on a surface thereof.

Figure 2:
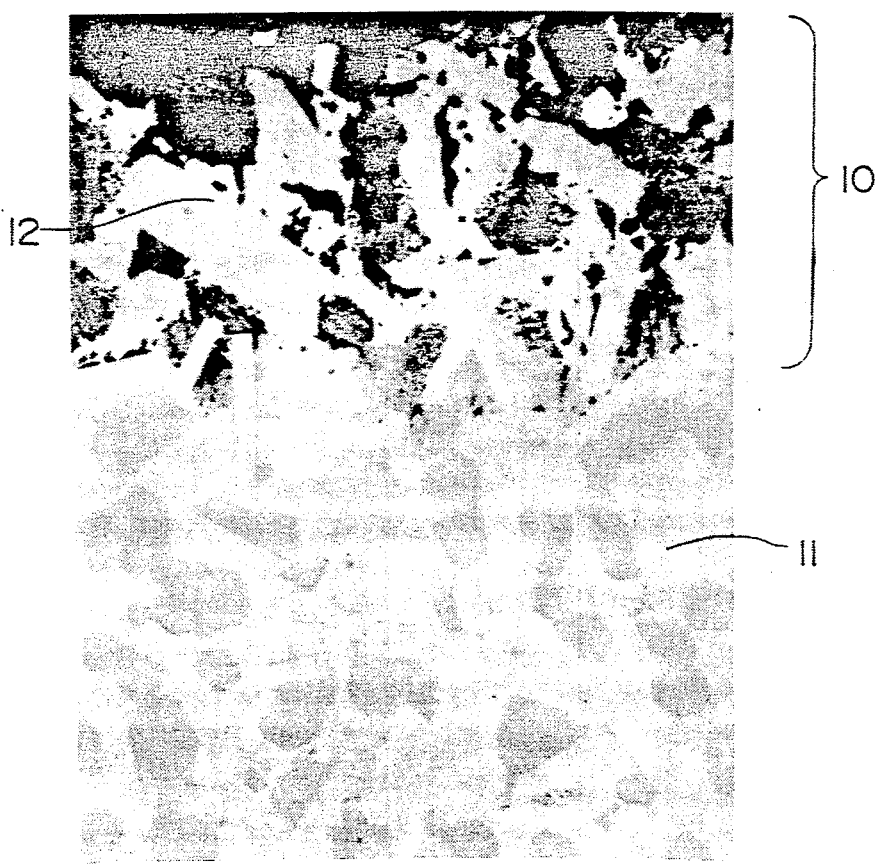
FIG. 2 is a photomicrograph at 400× of a section formed according to Example 1.

FIG. 2 is a photomicrograph at 400× of a section of the ZBC body having a modified layer formed in accordance with Example 1. The region 10 of FIG. 2 represents the modified or siliconized surface. The $ZrB_2$ platelets 12 in the modified layer appear to be substantially unaffected by the modification or siliconizing treatment as can be determined upon comparison to the $ZrB_2$ platelets 11 in the unmodified region. The modified layer comprises the phases of $ZrSi_2$ and $ZrSiO_4$ as well as minor portions of $ZrO_2$.

EXAMPLE 2

This example was conducted substantially in accordance with Example 2 with the exception that a bedding comprising $SiO_2$ and silicon metal was utilized. Specifically, a ZBC bar formed substantially according to the procedures set forth in Example 1 in application Ser. No. '533 was first formed. The bar measured about 1.7 centimeters in length by about 0.6 centimeters in width and about 0.3 centimeters in thickness. The ZBC bar weighed about 1.62 grams. The ZBC bar was placed into a bedding comprising about 24 grams of No. 500 $SiO_2$ and about 8 grams of $-300$ mesh silicon metal, the bedding being contained in a high purity alumina boat. The ZBC bar was substantially surrounded by the bedding material.

The alumina boat containing the ZBC bar and the bedding was placed into a furnace which was twice evacuated and backfilled with argon. The furnace was heated in accordance with Example 1. The furnace was allowed to cool and the alumina boat removed. It was discovered that a surface of the ZBC bar had been modified. Specifically, the surface comprised an oxidation resistant silicon-containing coating.

EXAMPLE 3

The post-treatment procedures of this example were similar to the procedures set forth in Example 1, with the exception that the bedding material comprised $Al_2O_3$ and silicon metal. Specifically, a ZBC bar formed substantially in accordance with the procedure set forth in Example 1 and U.S. application Ser. No. '533 was utilized. The bar measured about 2.1 centimeters in length and about 0.6 centimeters in width and about 0.3 centimeters in thickness. The ZBC bar weighed about 2.1 grams. The ZBC bar was substantially surrounded by a bedding by a high purity alumina boat. The bedding comprised about 30 grams of (A17) $Al_2O_3$ and about 10 grams of silicon metal. The alumina boat containing the bedding and the ZBC bar was placed into a electric resistance heating furnace and twice evacuated and backfilled with argon. The furnace was heated in accordance with Example 1.

The alumina boat was removed from the furnace and inspected. It was discovered that a surface of the ZBC had been modified. Specifically, the surface comprised on oxidation resistant silicon and aluminum-containing coating.

EXAMPLE 4

The post-treatment procedures of this example were similar to the procedures set forth in Example 1, with the exception that a bedding comprising SiC and silicon metal was utilized. Specifically, a ZBC bar formed substantially in accordance with the procedures set forth in Example 1 in U.S. application Ser. No. '533 was utilized. The ZBC bar measured about 3 centimeters in length by about 0.6 centimeters in width and about 3 centimeters in thickness. The bar weighed about 3 grams. The ZBC bar was placed into a high purity alumina crucible containing a bedding which substantially surrounded the ZBC bar. The bedding comprised about 24 grams of SiC, sold under the trade name of Exolon, with about 8 grams of silicon metal. The aluminum crucible containing the ZBC bar and the bedding was placed into an electric resistance heating furnace. The furnace was twice evacuated and backfilled with argon. The furnace was heated in accordance with Example 1.

The alumina crucible was removed and inspected. It was discovered that a surface of the ZBC bar had been modified. Specifically, the surface comprised an oxidation resistant silicon-containing coating.

EXAMPLE 5

The post-treatment procedures of this example were similar to the procedures set forth in Example 1, with the exception that a bedding comprising silicon metal was utilized. A ZBC bar formed substantially in accordance with procedures set forth in Example 1 of U.S. application Ser. No. '533 was utilized. Specifically, the ZBC bar measured about 3 centimeters in length and about 0.6 centimeters in width and about 0.3 in thickness. The ZBC bar weighed about 3.2 grams. The ZBC bar was placed into a bedding which substantially surrounded the ZBC bar, both of which were contained within a high purity alumina boat. The bedding comprised about 32 grams of silicon metal. The alumina boat containing the bedding and the ZBC bar was placed into an electric resistance heating furnace. The furnace was twice evacuated and backfilled with argon. The furnace was heated substantially in accordance with Example 1. The furnace was allowed to cool and the alumina boat was removed and inspected. It was discovered that a surface of the ZBC bar had been modified. Specifically, the surface comprised an oxidation resistant silicon-containing coating.

What is claimed is:

1. A method of producing a self-supporting ceramic composite body comprising producing a first composite body by:

selecting a parent metal;

heating said parent metal in a substantially inert atmosphere to a temperature sufficient to permit infiltration of molten parent metal into a mass comprising boron carbide and reacting molten parent metal with said boron carbide to form at least one boron-containing compound;

continuing said infiltration reaction for a time sufficient to produce said first composite body comprising at least one parent metal boron-containing compound; and contacting said first composite body with a source of a second metal, thereby reacting at least a portion of said first composite body with said second metal to modify at least one property of the first composite body in at least a portion thereof, thereby producing said self-supporting body.

2. A method according to claim 1, wherein said source of second metal comprises at least one material selected from the group consisting of an aluminum-containing material and a silicon-containing material.

3. A method according to claim 1 or 2, wherein said first composite body comprises $ZrB_2$, $ZrC$ and $Zr$.

4. A method according to claim 1, further comprising modifying said at least a portion of said first composite body by including a third metal with said second metal.

5. A product produced in accordance with claim 1.

* * * * *